Patented Oct. 30, 1928.

1,689,740

UNITED STATES PATENT OFFICE.

CARL METTLER, OF BASEL, SWITZERLAND, ASSIGNOR TO THE FIRM J. R. GEIGY A. G., OF BASEL, SWITZERLAND.

DITOLYLMETHANE AZO-DYESTUFFS AND PROCESS OF MAKING SAME.

No Drawing. Original application filed January 14, 1927, Serial No 161,240, and in Germany January 28, 1926. Divided and this application filed November 25, 1927. Serial No. 235,759.

This application is divisional of the application Ser. No. 161,240, filed January 14, 1927.

When aniline reacts with chloromethyl-ortho-cresotinic acid, there is obtained in good yield aniline-methylene-ortho-cresotinic acid in accordance with the following equation

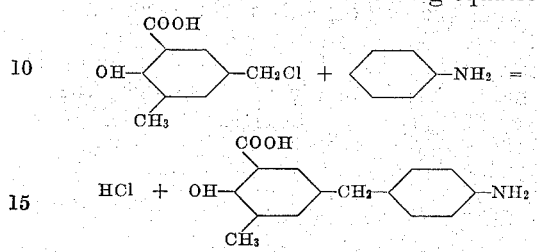

Like derivatives of diphenylmethane are obtained when there is used instead of aniline another amine of the benzene or naphthalene series, and instead of chloromethyl-ortho-cresotinic acid another chloromethyl derivative of an ortho-hydroxycarboxylic acid. Hitherto these compounds have not found application in the manufacture of dyestuffs.

By the present invention a new series of mordant dyeing azo-dyestuffs is obtained by diazotizing a derivative of a ditolylmethane containing in one nucleus an amino-group capable of being diazotized and in the other an orthohydroxy-carboxylic acid group, and coupling the product with any azo-dyestuff component.

The dyestuffs thus made are valuable because when a chromium salt is added they yield in cotton printing red and violet tints which are as vivid as those which hitherto have been produced by the dyestuffs of the triphenylmethane series; at the same time the tints have very good fastness to washing, chlorine and light. On the other hand, wool dyestuffs can be made which yield dyeings that when after-chromed are fast to fulling and potting. Finally, these dyestuffs are suitable for making lakes.

That the ditolylmethanes in question could be used for a smooth production of azo-dyestuffs was not to be expected; for nitrous acid frequently acts to decompose such diarylmethanes having two auxochrome groups in para- or ortho-position to the methane residue, or to oxidize them at the methane group (see German patent specification No. 245,769). The production of such pure tints with these mordant dyestuffs was not to be expected.

The following example illustrates the invention:—

20 kilos of chloromethyl-ortho-cresotinic acid (see German patent specification No. 236,046) are boiled with 200 litres of water and 21,4 kilos of toluidine for 16 hours in a reflux apparatus. When the mass has cooled it is made alkaline with sodium carbonate and the unaltered toluidine is distilled in steam. By addition of hydrochloric acid the ortho-toluidine-methylene-ortho-cresotinic acid is precipitated. When dry it is a colorless powder, which is insoluble in water but passes into solution on addition of sodium carbonate. A quantity of the ortho-toluidine-methylene-ortho-cresotinic acid corresponding with 6.9 kilos of sodium nitrite is diazotized in cold hydrochloric acid and coupled with the calculated quantity of 1-naphtol-3:6-disulphonic acid in solution alkaline with sodium carbonate. After stirring for 24 hours the whole is warmed and the dyestuff salted out. When dry it is a brown-red powder, easily soluble in water to a yellow-red solution and in concentrated sulphuric acid to a yellowish-red solution. When printed on cotton with a chromium salt a clear vivid red is provided which is fast to boiling soap, sodium carbonate and chlorine. On wool it yields from an acetic acid bath yellowish-red tints. The product obtained according to this example may have the following formula:

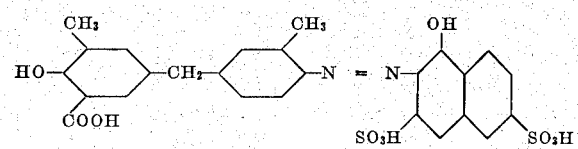

An analogous red tint of like properties is obtained when 1-napthol-3:8-disulphonic acid is used as second component. In both cases, the product constitutes in form of its sodium salt a red powder easily soluble in water and concentrated sulphuric acid with a red color, yielding red tints on wool from an acetic acid bath as well as when printed on cotton with a chromium salt.

Instead of the amino-compound named any other amino-ditolylmethane derivative may be used, which can be obtained by reaction of an amine of the benzene series with a chloromethyl-derivative of an aromatic ortho-hydroxy carboxylic acid, such as salicylic acid, a halogen substitution product of such an acid, etc. In general, any ditolylmethane derivative of the kind described may be used.

So also instead of the azo-dyestuff components named any other components of this kind may be used whereby dyestuffs of very different tints and fastness are obtained.

What I claim is:

1. A process for the manufacture of mordant dyeing azo-dyestuffs, consisting in diazotizing a ditolylmethane derivative which contains in one nucleus an amino-group and in the other an ortho-hydroxy-carboxylic acid group, and coupling with an axo-dyestuff component.

2. A process for the manufacture of mordant dyeing azo-dyestuffs, consisting in diazotizing ortho-toluidine-methylene-ortho-cresotinic acid and coupling with an azo-dyestuff component.

3. A process for the manufacture of mordant dyeing azo-dyestuffs, consisting in diazotizing ortho-toluidine-methylene-ortho-cresotinic acid and coupling with 1-napthol-3:6-disulphonic acid in alkaline solution.

4. As a new article of manufacture the hereinbefore described mordant dyeing dyestuff obtained by diazotizing ortho-toluidine-methylene-ortho-cresotinic acid and coupling with 1-napthol-3:6-disulphonic acid and constituting in form of its sodium salt a red powder easily soluble in water and concentrated sulphuric acid with a red color and yielding red tints on wool from an acetic acid bath and when printed on cotton with a chromium salt.

In witness whereof I have hereunto signed my name this 11th day of November, 1927.

CARL METTLER.